United States Patent [19]

Mannion

[11] Patent Number: 5,310,950
[45] Date of Patent: May 10, 1994

[54] POLYOLEFIN COMPOSITION CONTAINING ULTRAFINE SORBITOL AND XYLITOL ACETALS

[75] Inventor: Michael J. Mannion, Spartanburg, S.C.

[73] Assignee: Milliken Research Corporation, Spartanburg, S.C.

[21] Appl. No.: 7,260

[22] Filed: Jan. 21, 1993

Related U.S. Application Data

[62] Division of Ser. No. 877,405, May 1, 1992, Pat. No. 5,198,484.

[51] Int. Cl.$^5$ .......................................... C07D 407/04
[52] U.S. Cl. .................................................... 549/364
[58] Field of Search ........................................ 549/364

[56] References Cited

U.S. PATENT DOCUMENTS

| | | | |
|---|---|---|---|
| 4,016,118 | 4/1977 | Hamada et al. | 260/17.4 |
| 4,314,039 | 2/1982 | Kawai et al. | 525/1 |
| 4,371,645 | 2/1983 | Mahaffey, Jr. | 524/108 |
| 4,410,649 | 10/1983 | Cieloszyk | 524/108 |
| 4,532,280 | 7/1985 | Kobayashi et al. | 524/108 |
| 4,845,137 | 7/1989 | Williams et al. | 524/108 |
| 4,954,291 | 9/1990 | Kobayashi et al. | 252/315.1 |
| 5,049,605 | 9/1991 | Rekers | 524/108 |

OTHER PUBLICATIONS

*Binsbergen, Polymer 11 (1970) pp. 253-267*: Discussion of nucleating agents for polypropylene including effects of the degree and method of dispersion of the nucleating agent.

*Plastics Additives Handbook, edited by Gachter/Muller, pp. 671-676 & 679-683 (1985)*: Discussion of nucleating agents for partly crystalline polymers, especially nucleating agents which are insoluble in the polymer.

*Primary Examiner*—Nicky Chan
*Attorney, Agent, or Firm*—Timothy J. Monahan; Terry T. Moyer

[57] ABSTRACT

A process for incorporating a clarifying agent into a semi-crystalline polyolefin resin is provided whereby a clarifying agent selected from compounds having the formula:

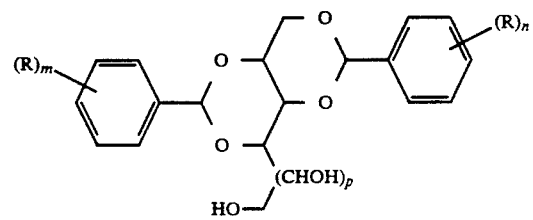

wherein p is 0 or 1, m and n are independently 0–3, and R is, at each occurrence, independently selected from $C_{1-8}$ alkyl, $C_{1-4}$ alkoxy, hydroxy, halogen, $C_{1-6}$ alkylthio, $C_{1-6}$ alkylsulfoxy and a 4 or 5 membered alkyl group forming a carbocyclic ring with adjacent carbon atoms of the unsaturated parent ring, and wherein the clarifying agent is in the form of a powder characterized by a $d_{97}$ of 30 microns or less, and a mean particle size of 15 microns or less, is blended with the polyolefin resin, at a temperature above 170° C. until the clarifying agent is dissolved in the molten resin.

18 Claims, 4 Drawing Sheets

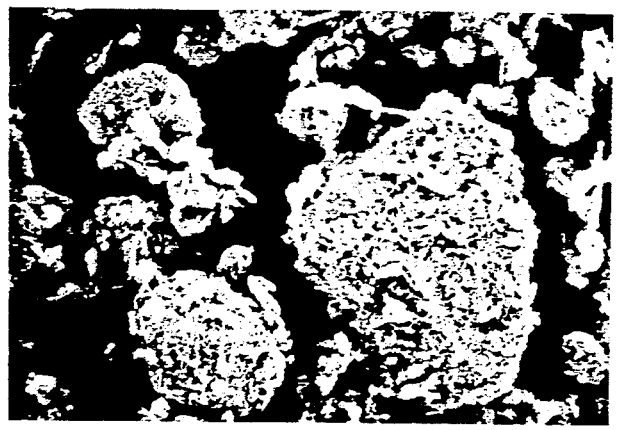
FIG. -1-
FIG. -2-
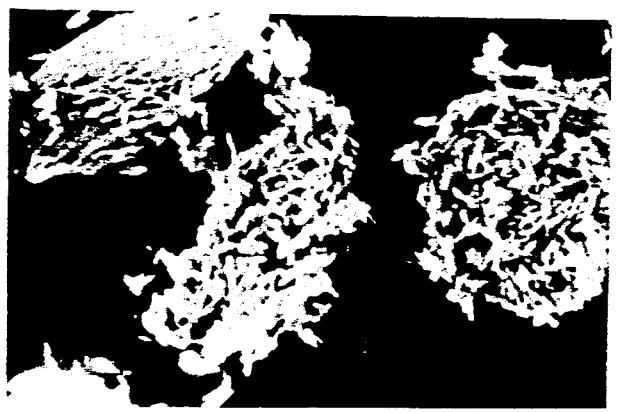
FIG. -3-

FIG. -4-
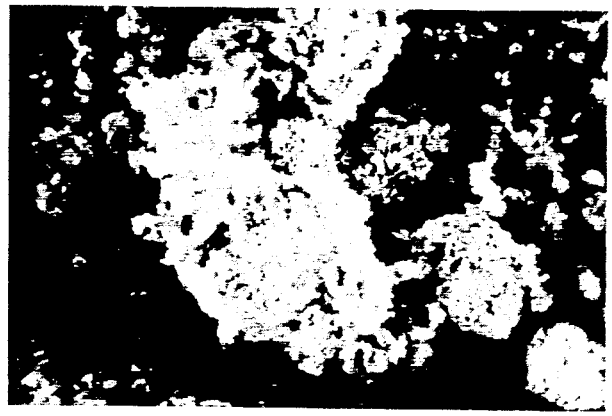
FIG. -5-
FIG. -6-

FIG. -7-
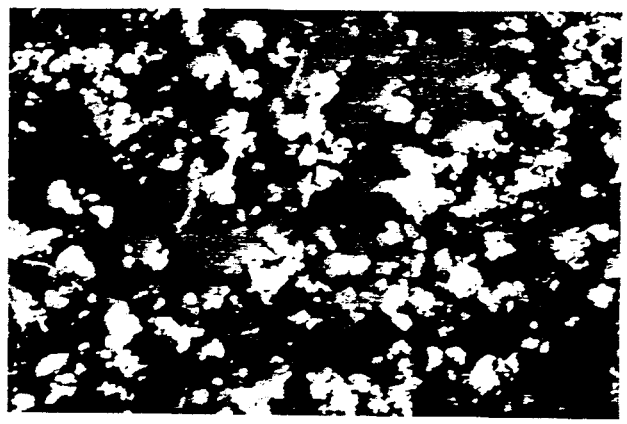
FIG. -8-
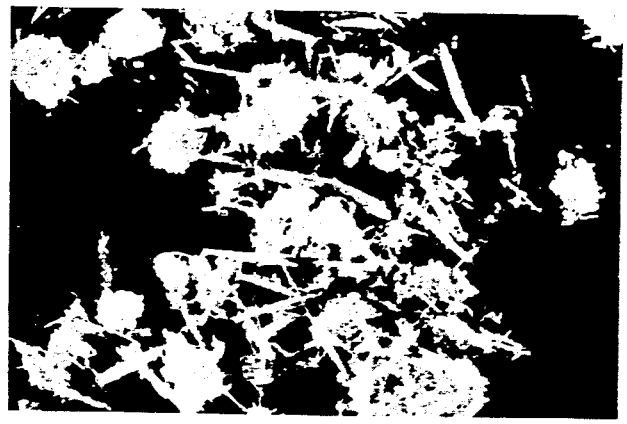
FIG. -9-

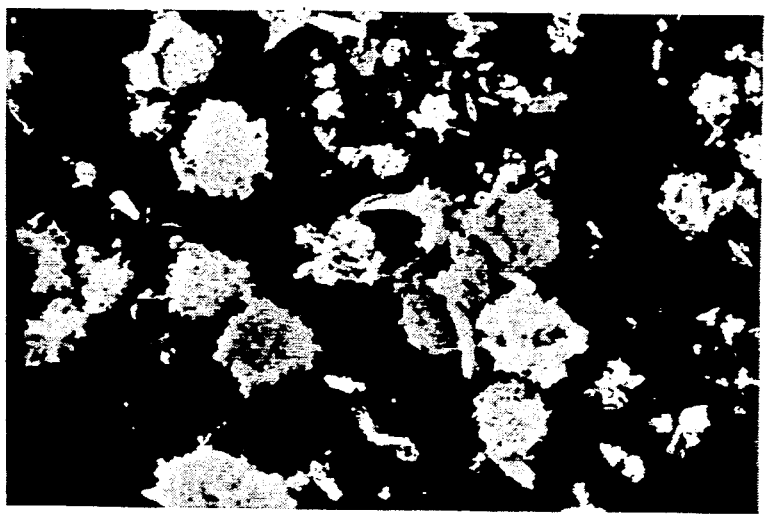
FIG. —10—

POLYOLEFIN COMPOSITION CONTAINING ULTRAFINE SORBITOL AND XYLITOL ACETALS

This is a divisional application of patent application Ser. No. 07/877,405, filed May 1, 1992, now U.S. Pat. No. 5,198,484.

BACKGROUND OF THE INVENTION

This invention relates generally to acetals of sorbitol and xylitol useful as clarifying agents for crystalline polyolefin resins, and particularly, to the use of clarifying agents which have been reduced to their primary particle size—ultrafine powders.

The use of clarifying agents to reduce the haze in articles manufactured from crystalline polyolefin resins is well known in the art. Representative acetals of sorbitol and xylitol, which have been employed as clarifying agents, include the following U.S. patents:

Hamada, et al., U.S. Pat. No. 4,016,118
  Dibenzuylidene sorbitols
Kawai, et al., U.S. Pat. No. 4,314,039
  Di(alkylbenzylidene) sorbitols
Mahaffey, Jr., U.S. Pat. No. 4,371,645
  Di-acetals of sorbitol having at least one chlorine or bromine substituent
Kobayashi, et al., U.S. Pat. No. 4,532,280
  Di(methyl or ethyl substituted benzylidene) sorbitols
Williams, et al., U.S. Pat. No. 4,845,137
  Dibenzylidene sorbital derivatives having at least one substituent group containing sulphur
Kobayashi, et al., U.S. Pat. No. 4,954,291
  Distribution of diacetals of sorbitol and xylitol made from a mixture of dimethyl or trimethyl substituted benzaldehyde and unsubstituted benzaldehyde
Rekers, U.S. Pat. No. 5,049,605
  Bis(3,4-dialkylbenzylidene) sorbitols including substituents forming a carbocyclic ring Additionally, generic structures for clarifying agents useful in polypropylene are disclosed in published Japanese applications Mitsubishi Petroch KK, No. 85-157213/26; and Sumitomo Chem Ind. KK, No. 88-130662/19. Techniques for manufacturing the clarifying agents are disclosed in the above references, and in Murai, et al., U.S. Pat. No. 3,721,682; and New Japan Chemical Company, U.K. Patent Application, GB 2,115,405 A. All of the above patents and published applications are incorporated by reference herein.

Although the exact mechanism is not well understood, it is generally believed that the clarifier must melt and recrystallize to form a very fine network within the polyolefin resin. This crystalline network provides nucleation sites, which reduces the size of the spherulites formed in the resin as it cools. Small spherulites do not scatter visible light as effectively as large spherulites, so the nucleated polyolefin resin has improved clarity.

Clarified polypropylene is produced by blending a clarifying agent with the base polyolefin resin, along with other additives such as antioxidants, acid scavengers and lubricants, and then extruding the mixture at a temperature above the melting point of the clarifying agent. A more popular method for producing clarified polyolefin resin involves pre-blending all or some of the additives with a portion of the base resin to make a powder master batch. The master batch is metered into the extruder with additional base resin to eliminate the need for large mixers. The extrudate is usually formed into small pellets. Alternatively, the master batch itself may be extruded and pelletized. These pellet concentrates may be mixed with polyolefin resin which has been extruded without additives to obtain a product having the desired concentration of clarifying agent, generally from 0.01 up to 2 or 3 wt. %.

There are a number of difficulties associated with the use of sorbitol and xylitol acetal clarifying agents in polyolefin resin. One major problem is the formation of "white points" of bubbles in articles fabricated from these resins. Small bubbles in the side walls of injection molded housewares and medical devices are considered a major defect, so several methods have been employed to minimize this problem.

One approach found through experimentation is to add small quantities of polar fatty additives, such as glycerol monostearate or fatty amides, to the sorbitol acetal clarified polyolefin resin. These additives reduce the number of bubbles observed in fabricated parts but do not eliminate the problem. Also, polar fatty additives tend to "bloom" or migrate slowly to the surface of the fabricated parts and form a waxy build-up, which is undesirable.

A second approach used to solve the bubble problem with sorbitol and xylitol acetal clarified polyolefins is to melt compound the resin 3° to 10° C. above the melting point of the clarifying agent. While this solution has been workable, it has several major drawbacks. Sorbitol acetal clarifiers typically have melting points 50° to 100° C. higher than the polyolefin resins with which they are compounded. Compounding the polyolefin resin above the melting point of the clarifier can cause color and odor formation in the plastic. Also, it is quite difficult to control the temperature in a large production extruder, so there usually is some off quality produced during the start of a campaign. Sorbitol and xylitol acetal clarifiers tend to boil or sublime near their melting point. Compounding above the melting point of the clarifier can cause plate out at the extruder die, which is undesirable.

A third approach used to eliminate bubbles or "fish eyes" with sorbitol acetal clarified polyolefins has been described by Kobayashi, et al., U.S. Pat. No. 4,954,291 (especially columns 1,2,3,4). This method involves using a distribution of di-acetals of sorbitol made from a mixture of benzaldehyde and di- or tri-methyl substituted benzaldehyde. The composition has a relatively low melting point, but still must be compounded above its melting point to avoid bubbles. Also, the composition has relatively poor clarifying properties compared to di-acetals of sorbitol made entirely from alkyl substituted benzaldehydes.

The problem of "white points" or bubbles in clarified polyolefin resins has received a great deal of investigation. Nevertheless, the exact mechanism of bubble formation and the role that polar fatty additives play in helping to eliminate them are not well understood.

In addition to di-acetals of sorbitol and xylitol, salts of aromatic carboxylic acids, such as sodium benzoate, have been employed as nucleating agents in polyolefin resin with some success. Unlike the acetals, which are compounded at temperatures above their melting point and recrystallize in the resin to provide nucleation sites, sodium benzoate, with a melting point greater than 300° C., does not melt during compounding and typically will decompose before melting. Further, sodium benzoate has been found to be insoluble and immiscible in polyolefins. Therefore, the performance of sodium benzoate as a nucleating agent is dependant upon its dispersion in the polymer melt in as fine a form as possible; in the range of 1 to 10 microns. "Plastic Additives Handbook", Gachter et al. editor, Hanser Publishers, Munich, Germany, pp. 671-683 (1985); and Binsbergen, "Heterogeneous Nucleation in the Crystallization of Polyolefins (1)", Polymer 11, pp. 253-267 (1970). Conversely, the nucleation effects of di-acetals of sorbitol and xylitol appear to be largely independent of their physical characteristics prior to compounding, given the requirement that they are dispersed and recrystallized in the polyolefin resin.

The present invention provides a technique to process sorbitol and xylitol acetal clarifiers so they can be compounded with polyolefin resins to produce fabricated parts without "white points" or bubbles without the use of excessive compounding temperatures which can cause discoloration and odor.

BRIEF DESCRIPTION OF THE DRAWINGS

FIG. 1 is a photomicrograph of an agglomerated dibenzylidene sorbitol clarifying agent.

FIG. 2 is a photomicrograph of an agglomerated dibenzylidene sorbitol clarifying agent.

FIG. 3 is a photomicrograph of an agglomerated di(p-methylbenzylidene) sorbitol clarifying agent.

FIG. 4 is a photomicrograph of an agglomerated di(p-ethylbenzylidene) sorbitol clarifying agent.

FIG. 5 is a photomicrograph of an agglomerated mixed aldehyde sorbitol made from benzaldehyde and di- or tri-methyl substituted benzaldehyde clarifying agent.

FIG. 6 is a photomicrograph of an agglomerated bis(3,4-dimethylbenzylidene) sorbitol clarifying agent.

FIG. 7 is a photomicrograph of an agglomerated bis(5',6',7',8'-tetrahydro-2-naphthylidene) sorbitol clarifying agent.

FIG. 8 is a photomicrograph of an ultrafine dibenzylidene sorbitol clarifying agent which is the product of jet milling the material shown in FIG. 1.

FIG. 9 is a photomicrograph of an ultrafine bis(3,4-dimethylbenzylidene) sorbitol clarifying agent, which is the product of jet milling the material shown in FIG. 6.

FIG. 10 is a photomicrograph of an ultrafine bis(5',6',7',8'-tetrahydro-2-naphthylidene) sorbitol clarifying agent, which is the product of jet milling the material shown in FIG. 7.

All of the photomicrographs were made at a magnification of 1000×.

DESCRIPTION OF THE INVENTION

The clarifying agents of interest include di-acetals of sorbitol and xylitol having the general formula:

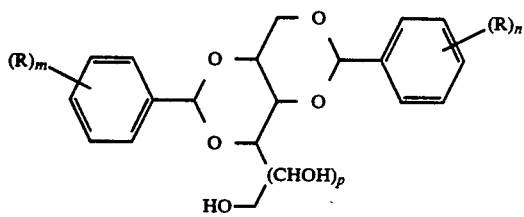

wherein p is 0 or 1, m and n are independently 0-3, R is, at each occurrence, independently selected from $C_{1-8}$ alkyl, $C_{1-4}$ alkoxy, hydroxy, halogen, $C_{1-6}$ alkylthio, $C_{1-6}$ alkylsulfoxy and a 4 or 5 membered alkyl group forming a carbocyclic ring with adjacent carbon atoms of the unsaturated parent ring. Of particular interest are clarifying agents where p is 1 and R is selected from $C_{1-4}$ alkyl, chlorine, bromine, thioether and a 4-membered alkyl group forming a carbocyclic ring with adjacent carbon atoms of the unsaturated parent ring. Examples of specific clarifiers having utility herein include: Dibenzylidene sorbitol, di(p-methylbenzylidene) sorbitol, di(o-methylbenzylidene) sorbitol, di(p-ethylbenzylidene) sorbitol, bis(3,4-dimethylbenzylidene) sorbitol, bis(3,4-diethylbenzylidene) sorbitol, bis(5',6',7',8'-tetrahydro-2-naphthylidene) sorbitol, bis(trimethylbenzylidene) xylitol, and bis(trimethylbenzylidene) sorbitol. Also within the scope of the present invention are compounds made with a mixture of aldehydes, including substituted and unsubstituted benzaldehydes, such as Kobayashi, et al., U.S. Pat. No. 4,532,280 and Kobayashi, et al., U.S. Pat. No. 4,954,291.

The di-acetals of the present invention may be conveniently prepared by a variety of techniques known in the art. Generally, such procedures employ the reaction of 1 mole of D-sorbitol or D-xylitol with about 2 moles of an aldehyde in the presence of an acid catalyst. The temperature employed in the reaction will vary widely depending on the characteristics, such as melting point, of the aldehyde or aldehydes employed as the starting material in the reaction. Examples of suitable reaction medium are cyclohexane, or a combination of cyclohexane and methanol. Water produced by the condensation reaction is distilled off. Typically, the mixture is allowed to react for several hours, after which the reaction is cooled, neutralized, filtered, washed, for example, with water or an alcohol, and then dried.

The cited background references, which have been incorporated herein, provide additional details of the synthesis of clarifying agents of the present invention. Of course, if desired, a mixture of benzaldehydes and/or substituted benzaldehydes may be provided in the reaction mixture.

The di-acetals of sorbitol and xylitol of the present invention prepared by the above techniques may contain byproducts of mono-acetal and tri-acetal as impurities. Although it may not always be necessary to remove these impurities prior to incorporation of the di-acetal into a polyolefin resin, it may be desirable to do so, and purification may serve to enhance the transparency of the resin produced thereby. Purification of the di-acetal may be accomplished, for instance, by removal of tri-acetal impurities by extraction with a relatively non-polar solvent prior to filtration. By removal of the impurities, the product may be purified so that the amount of di-acetal in the additive composition contains 90% of the di-acetal or greater.

In commercial manufacturing operations the product is dried by using heat or heat and vacuum. The product is reduced in size by using mechanical delumping devices followed by milling in a pin or stud mill. The milled produce is usually classified using screening devices to remove oversized particles. Screen sizes typically range from 40 to 80 mesh to control the maximum particle size between 176 and 420 μm. Particle size measurement is not an exact science. By convention, the 97th percentile or $d_{97}$ is typically used as a measure of maximum particle size. Screens finer than 80 mesh are not used because they tend to blind or plug up very quickly.

Correlation of mesh screen and opening size is as follows:

Notes:

A US Standard ASTME 11-61 40 mesh screen=420 μm opening
A US Standard ASTME 11-61 80 mesh screen=176 μm opening Investigations into the original of the aforementioned "white point" or bubble problem led to the following experiments.

EXAMPLE 1

A small quantity of a commercial lot of Millad ® 3905 (dibenzylidene sorbitol) obtained from Milliken Chemical, Spartanburg, S.C., U.S.A., having a $d_{97}$ of 250 microns and a mean particle size of 84 microns, was dispersed in mineral oil and placed on a hot stage microscope. The specimen was heated from room temperature at a rate of 10° C., per minute. Bubbles were observed to evolve from the individual particles at 223° C., before the particles melted at 228° C.

The dibenzylidene sorbitol product of Example 1 was examined under a scanning electron microscope (SEM) at a magnification of 1000×. Referring to FIG. 1, a photomicrograph of the product indicates that the individual particles are agglomerates of tiny fibers or "primary particles." Further, the surface of the agglomerates seems to be sintered or fused. It is believed that these sintered particles trap gas or volatile liquids which are released when the particle softens prior to melting. When this phenomena occurs during fabrication operations, then white points or bubbles are created. Additionally, it is also believed that gasses trapped within the sintered particles provide insulation and otherwise interfere with efficient heat transfer which is required to melt and dissolve the clarifier in the polymer melt.

Surprisingly, an analysis of other commercial sorbitol acetal clarifiers which included the products of several different manufacturers revealed that all of the products were agglomerates of tiny fibers or "primary particles" with surfaces that seem to be sintered. Table 1 below indicates the figure number, clarifying agent, trade name, and manufacturer for these commercial products.

TABLE 1

| Figure | Clarifying Agent | Trade Name | Manufacturer |
|---|---|---|---|
| FIG. 1 | Dibenzylidene Sorbitol | Millad ® 3905 | Milliken Chemical |
| FIG. 2 | Dibenzylidene Sorbitol | EC-1 | E.C. Chemical |
| FIG. 3 | Di(p-methylbenzylidene) Sorbitol | Millad ® 3940 | Milliken Chemical |
| FIG. 4 | Di(p-ethylbenzylidene) Sorbitol | NC-4 | Mitsui Toatsu |
| FIG. 5 | Mixed aldehyde sorbitol made from benzaldehyde and di- or tri-methyl substituted benzaldehyde | Gel-All DH | New Japan Chemical |
| FIG. 6 | Bis(3,4-dimethylbenzylidene) Sorbitol | not available | Milliken Chemical |
| FIG. 7 | Bis(5',6',7',8'-tetrahydro-2-naphthylidene) Sorbitol | not available | Milliken Chemical |

The sample of clarifying agent described in Example 1 (dibenzylidene sorbitol from Milliken Chemical) was subjected to comminution to expose the surfaces of the sintered particles.

EXAMPLE 2

The dibenzylidene sorbitol identified in Example 1, having a $d_{97}$ of 250 microns and a mean particle size of 84 microns, was fed to a fluidized bed, opposed Jet Mill Model Number 100 AFG manufactured by Micron Powder Systems. The mill was equipped with a deflector-wheel type classifier. The sample was intensely milled and classified to produce a particle characterized by a $d_{97}$ of less than 8 microns and a mean particle diameter of less than 4 microns as measured by laser light scattering. These measurements were confirmed by microscopic image analysis. FIG. 8 is a photomicrograph of the comminuted product at magnification of 1000×. Also, the packed bulk density of the powdered sample was reduced from 0.475 to 0.142 g/cm$^3$ as a result of this size reduction.

EXAMPLE 3

A small quantity of the ultrafine, dibenzylidene sorbitol clarifying agent which is the product of Example 2, was dispersed in white mineral oil and heated at 10° C./min. on a hot state microscope. The ultrafine primary particles of dibenzylidene sorbitol dissolved at 170° C. without the formation of bubbles. This is a profound difference from the agglomerated sintered material which must be heated to 223°-228° C. before it releases gas and then melts.

The term "dissolved" is used herein to describe the phenomenon of the clarifying agent diffusing into the molten resin, even at temperatures below the melting point of the clarifying agent. However, considering the viscosity of the resin melt, the clarifying agent is not necessarily homogeneously distributed throughout the resin. Nevertheless, the clarifying agent is observed to recrystallize from the polymer melt, after it has recrystallize from the polymer melt, after it has dissolved.

In addition to the particle size reduction performed in Example 2, the clarifying agents set forth in Table 1 were also similarly milled and classified. As a result of the analysis of these comminuted materials, the following general observations may be made. The diacetals of sorbitol and xylitol of interest herein may be characterized by a "fibrous, crystalline primary particle" having a length of about 5 to 10 microns and a diameter of about 0.3 to 0.7 microns. It has been found that these primary particles and small agglomerates of these primary particles containing up to several individual particles, do not exhibit the tendency to trap gasses, which has been found to result in the formation of bubbles in the clarified resin and insulation of the clarifying agent during the compounding step. Thus, clarifying agents, in the form of a powder having a $d_{97}$ of less than 30 microns and a mean particle size of less than 15 microns have been found to be useful in the practice of the present invention. Preferably, the clarifying agent has a particle size characterized by a $d_{97}$ of less than 20 microns and a mean particle size of less than 10 microns, more preferably a $d_{97}$ of less than 10 microns and a mean particle size of less than 6 microns.

In addition to particle size reduction using an opposed jet fluidized bed, there are other methods which can be used to produce a sorbitol acetal clarifier with the primary particles exposed and un-sintered. Fluidized bed spray drying is one viable option. Standard comminution using a pin mill followed by air classification is another method. A complete overview of size reduction technology may be found in the following articles: Kukla, "Understand Your Size-Reduction Options", Chemical Engineering Process, pp. 23-35 (May, 1991); and Hixon, "Select An Effective Size-Reduction System", Chemical Engineering Process, pp. 36. (May, 1991).

After jet milling, there may be some mechanical entanglement or static clinging of the fibrous particles to form "fuzzy balls" or other loose association. However, these loose associations are easily distinguished by particle size analysis from the sintered agglomerates formed by prior art processing of clarifying agents.

The particle size distributions of the clarifying agents described herein were measured using laser light scattering techniques. The powder sample is first dispersed in water using a surfactant as a wetting agent. The cloudy mixture is constantly agitated and circulated through a sample cell. A laser beam is passed through the sample cell causing light to be scattered in a manner related to the particle size distribution of the sample. The scattered light is collected on a photo-diode array and is translated into a histogram or particle size distribution. Fibrous materials which are mechanically entangled are usually disassociated and easily dispersed in this method.

In general, laser light scattering results agree well with the results obtained by microscopic image analysis. The presence of loose associations and geometric effects can cause error in the microscopic image analysis technique, so it is believed that the laser light scattering methods are more reliable.

The polyolefin polymers of the present invention may include aliphatic polyolefins and copolymers made from at least one aliphatic olefin and one or more ethylenically unsaturated comonomers. Generally, the comonomers, if present, will be provided in a minor amount, e.g., about 10% or less or even about 5% or less, based upon the weight of the polyolefin. Such comonomers may serve to assist in clarity improvement of the polyolefin, or they may function to include other properties of the polymer. Examples include acrylic acid, methacrylic acid, and esters of the same, vinyl acetate, etc.

Examples of olefin polymers whose transparency can be improved conveniently according to the present invention are polymers and copolymers of aliphatic mono-olefins containing from 2 to about 6 carbon atoms, which have an average molecular weight of from about 10,000 to about 2,000,000, preferably from about 30,000 to about 300,000, such as polyethylene, linear low density polyethylene, polypropylene, crystalline ethylene/propylene copolymer (random or block), poly(1-butene) and polymethylpentene. The polyolefins of the present invention may be described as semi-crystalline, basically linear, regular polymers which may optionally contain side chains, such as are found in conventional low density polyethylene.

Other polymers which may benefit from the reduced particle sized clarifying agents of the present invention include polyethylene terephthalate, glycol modified polyethylene terephthalate, polybutylene terephthalate, and polyamides.

Other additives may also be used in the composition of the present invention, provided they do not interfere with the primary benefits. It may even be advantageous to premix these additives with the clarifying agent. Such additives are well known to those skilled in the art and include plasticizers, lubricants, catalysts neutralizers, antioxidants, light stabilizers, colorants, other nucleating agents, and the like. Some of these additives may provide further beneficial property enhancements, including improved aesthetics, easier processing, and improved stability.

The amount of clarifying agent used relative to the polyolefin resin may vary widely depending on whether or not the composition is to be provided as a concentrate. For use in a molded article, from 0.01 to 3 parts of clarifying agent per 100 parts of resin may be used, preferably from 0.05 to 2 parts of clarifying agent per 100 parts of resin. Below 0.01 parts, the transparency characteristics of the resin may not be sufficiently improved; above 3 parts, little additional advantage is observed in the clarified resin.

Concentrates of up to 100 parts of the clarifying agent per 100 parts of polyolefin resin may be made. Typically, concentrates containing less than 33 parts of clarifying agent, and more preferably less than 15 parts of a clarifying agent, per 100 parts of resin are prepared commercially.

The process of the present invention is particularly adapted for commercial compounding of a clarifying agent and polyolefin resin. The term "compounding" is used broadly to describe the process of dispersing clarifying agent throughout a resin while the resin is in a molten state, i.e. heated to above its melting point. Often, the base resin, which has the appearance of a fluffy particulate, is dry blended with the desired additives including clarifying agents and extruded by the resin manufacturer. The resin is usually extruded a second time immediately before being processed into finished articles by, for example, injection molding, extrusion blow molding, injection blow molding, stretch blow molding, compression molding, rotational molding, profile extrusion, sheet extrusion, thermal forming, film extrusion, and film extrusion with orientation. Regardless of how many times the mixture of resin and clarifying agent is extruded or otherwise blended while in a molten state, it is important that prior to forming the composition into an article, that the clarifying agent be dissolved in the resin melt. In many cases, dissolution will be accomplished by the clarifying agent melting and being distributed throughout the molten resin. However, an advantage of the present process is that the clarifying agent may dissolve in the molten resin without even approaching the melting point of the clarifying agent.

Commercially, compounding is performed in an extruder, such as a single screw extruder, twin screw extruder, or Farrel continuous mixer. Extrusion conditions vary depending on the particular polyolefin resin. Typically, linear low density polyethylene is extruded at between 130° C. and 170° C. and polypropylene is extruded at between 210° C. and 240° C. The temperatures refer to the melt or stock temperature which is the temperature of the resin itself, rather than the barrel temperature of the extruder. It should be noted that when using prior art clarifying agents, manufactures typically operated at 3° C. to 6° C. above the melting temperature of the clarifying agent.

Unlike commercial products which have not been subject to intense comminution, the clarifying agents of the present invention will dissolve in polyolefin resin at temperatures as low as 170° C. Therefore, it can be seen that the clarifying agents of the present invention may be compounded in resin at temperatures below the melting point of the clarifying agent, a distinct improvement over the prior art process. The following comparative examples illustrate the surprising and dramatic improvements possible with the claimed invention.

EXAMPLE 4

Each of the clarifying agents described in Table 1 was blended with co-additives and 4 MFR polypropylene RCP base resin in a paddle mixer according to the following ratios:

- 2.5 grams clarifying agent to be tested
- 0.8 grams Irganox 1010
- 0.8 grams Calcium Stearate
- 1000 grams 4 MFR PP RCP The compositions were then extruded on a one inch single screw extruder, with a 32-to-1 L/D ratio and a Maddux mixing tip at various temperatures to determine the minimum compounding temperature necessary to eliminate bubbles. An initial temperature of 200° C. was selected and was increased by increments of 5° C. for each subsequent run of a particular composition if evidence of bubble formation was detected.

The compounded pellets were tested for bubble formation by injection molding then into 2"33 3"×0.05" plaques at 210° C. on a 40-ton injection molding machine. The plaques were analyzed visually for the presence of bubbles. The experiment was repeated after jet milling each of the above clarifying agents to produce an ultrafine powder prior to blending with the co-additives and base resin. The results are set forth in Table 2 below.

TABLE 2

| Clarifying Agent | | Commercial Size | | | Ultrafine | | |
|---|---|---|---|---|---|---|---|
| Chemical Name | Melting Pt. (°C.) | $d_{97}$ (μm) | Mean d (μm) | Minimum Compound Temp °C. | $d_{97}$ (μm) | Mean d (μm) | Compound Temp °C. |
| Dibenzylidene Sorbitol (DBS)[1] | 225 | 250 | 84 | 231 | 8 | 4 | 200 |
| Dibenzylidene Sorbitol (DBS)[2] | 224 | 420 | 120 | 231 | 20 | 9 | 200 |
| Di(p-methylbenzylidene) Sorbitol[3] | 245 | 180 | 41 | 248 | 4 | 2 | 200 |
| Di(p-ethylbenzylidene) Sorbitol[4] | 232 | 180 | 37 | 237 | 13 | 5 | 200 |
| Mixed aldehyde sorbitol made from benzaldehyde and di- or tri-methyl substituted benzaldehyde[5] | 228 | 180 | 28 | 231 | 6 | 2 | 200 |
| Bis(3,4-dimethyl-benzylidene) Sorbitol[6] | 265 | 90 | 18 | >270 | 9 | 3 | 200 |
| Bis(5',6',7',8'-tetrahydro-2-naphthylidene) Sorbitol[7] | 268 | 90 | 22 | >270 | 6 | 2 | 200 |

[1]Millad ® 3905, Milliken Chemical
[2]EC-1, E.C. Chemical
[3]Millad ® 3905, Milliken Chemical
[4]NC-4, Mitsui Toatsu
[5]Gel-All DH, New Japan Chemical
[6]Not available, Milliken Chemical
[7]Not available, Milliken Chemical The commercial-sized material had a $d_{97}$ of 180 to 420 microns and a mean particle size of 28 to 120 microns. In all cases, the melting point of the clarifying agent had to be exceeded by 3° C. to 7° C. in the compounding extruder to eliminate bubbles in the injection molded article.

The ultrafine clarifiers had a $d_{97}$ of 4 to 20 microns and a mean particle size of 2 to 9 microns. In each case, the ultrafine clarifying agent could be processed at the minimum practical compounding temperature of 200° C. for polypropylene on a single screw extruder. Photomicrographs of ultrafine dibenzylidene sorbitol, bis(3,4-dimethylbenzylidene) sorbitol and bis(5',6',7',8'-tetrahydro-2-naphthylidene) sorbitol, identified in footnotes 1, 6 and 7 above, are shown in FIGS. 8, 9 and 10, respectively.

The ultrafine clarifying agent features particles which have been reduced to their primary particle size or agglomerates of only a few primary particles. The ultrafine clarifying agent has the advantage of allowing compounding at a lower temperature, less heat input and increased speed through the compounding equipment, which in most cases will be an extruder. Further, the process of the present invention has the advantage of avoiding polar fatty acids and the attendant problems associated therewith in the clarified resin. Additional advantages of being able to operate at a lower temperature include avoiding discoloration of the resins, sublimation and plate out, and overshooting the extrudate temperature, which adversely affects the consistency of the resin and makes pelletizing difficult. The present invention is especially advantageous with regard to diacetals of sorbitol and xylitol made with substituted benzaldehydes, which result in a clarifying agent with a relatively high melting temperature, i.e. having a melting point of 250° C. or above, which are otherwise very difficult to incorporate into a polyolefin resin. Thus, the clarifying agents useful herein may be compounded at temperatures above 170°, preferably from 180° to 230° C.

There are, of course, many alternate embodiments and modifications of the invention which are intended to be included within the scope of the following claims.

What I claim is:

1. A powdered clarifying agent of the formula:

wherein p is 0 or 1, m and n are independently 0–3, and R is, at each occurrence, independently selected from $C_{1-8}$ alkyl, $C_{1-4}$ alkoxy, hydroxy, halogen, $C_{1-6}$ alkylthio, $C_{1-6}$ alkylsulfoxy and a 4 or 5 membered alkyl group forming a carbocyclic ring with adjacent carbon atoms of the unsaturated parent ring; further provided that said powdered clarifying agent is characterized by a $d_{97}$ of 30 microns or less, and a mean particle size of 15 microns or less.

2. The powdered clarifying agent of claim 1 wherein said clarifying agent has a $d_{97}$ of 20 microns or less, and a mean particle size of 10 microns or less.

3. The powdered clarifying agent of claim 2 wherein p is 1 and R is selected from $C_{1-4}$ alkyl, chlorine, bromine, alkylthio and a 4 membered alkyl group forming a carbocyclic ring with adjacent carbon atoms of the unsaturated parent ring.

4. The powdered clarifying agent of claim 1 wherein said clarifying agent has a $d_{97}$ of 10 microns or less, and a mean particle size of 6 microns or less.

5. The powdered clarifying agent of claim 4 wherein p is 1 and R is selected from $C_{1-4}$ alkyl, chlorine, bromine, alkylthio and a 4 membered alkyl group forming a carbocyclic ring with adjacent carbon atoms of the unsaturated parent ring.

6. The powdered clarifying agent of claim 3 wherein said clarifying agent has a melting point of 250° C. or greater.

7. The powdered clarifying agent of claim 1 wherein said clarifying agent has a melting point of 250° C. or greater.

8. A powdered clarifying agent selected from the group consisting of dibenzylidene sorbitol, di(p-methylbenzylidene) sorbitol, di(o-methylbenzylidene) sorbitol, di(p-ethylbenzylidene) sorbitol, bis(3,4-dimethylbenzylidene) sorbitol, bis(3,4-diethylbenzylidene) sorbitol, bis(5',6',7',8'-tetrahydro-2-naphthylidene) sorbitol, bis(trimethylbenzylidene) xylitol, and bis(trimethylbenzylidene) sorbitol; further provided that said powdered clarifying agent is characterized by a $d_{97}$ of 30 microns or less, and a mean particle size of 15 microns or less.

9. The powdered clarifying agent of claim 8 wherein said clarifying agent has a $d_{97}$ of 20 microns or less, and a mean particle size of 10 microns or less.

10. The powdered clarifying agent of claim 9 wherein said clarifying agent has a melting point of 250° C. or greater.

11. The powdered clarifying agent of claim 8 wherein said clarifying agent has a $d_{97}$ of 10 microns or less, and a mean particle size of 6 microns or less.

12. The powdered clarifying agent of claim 11 wherein said clarifying agent has a melting point of 250° C. or greater.

13. The powdered clarifying agent of claim 1 wherein p is 1, m and n are independently 1, 2 or 3, and R is $C_{1-4}$ alkyl.

14. The powdered clarifying agent of claim 2 wherein p is 1, m and n are independently 1, 2 or 3, and R is $C_{1-4}$ alkyl.

15. The powdered clarifying agent of claim 1 wherein p is 1, m and n are independently 1, 2 or 3, and R is methyl.

16. The powdered clarifying agent of claim 2 wherein p is 1, m and n are independently 1, 2 or 3, and R is methyl.

17. The powdered clarifying agent of claim 8 wherein said clarifying agent is bis(3,4-dimethylbenzylidene) sorbitol.

18. The powdered clarifying agent of claim 9 wherein said clarifying agent is bis(3,4-dimethylbenzylidene) sorbitol.

* * * * *